United States Patent [19]

Im et al.

[11] 4,238,342

[45] Dec. 9, 1980

[54] PROCESS OF MAKING SHAPED ARTICLE OF LITHIUM FERRITE CONTAINING PHOSPHORUS PENTOXIDE WITH VANADIUM PENTOXIDE OR BISMUTH TRIOXIDE SINTERING AGENTS

[75] Inventors: Ho B. Im, Seoul, Rep. of Korea; Donald G. Wickham, Malibu, Calif.

[73] Assignee: Ampex Corporation, Redwood City, Calif.

[21] Appl. No.: 57,140

[22] Filed: Jul. 12, 1979

Related U.S. Application Data

[63] Continuation of Ser. No. 907,039, May 18, 1978, abandoned.

[51] Int. Cl.$^3$ .............................................. C04B 35/26
[52] U.S. Cl. .............................. 252/62.61; 252/62.62; 252/62.56
[58] Field of Search ............... 252/62.61, 62.62, 62.56; 423/594

[56] References Cited

U.S. PATENT DOCUMENTS 3,630,912   12/1971   Argentina et al. ................ 252/62.61

FOREIGN PATENT DOCUMENTS

| 51-71993 | 6/1976 | Japan | 252/62.61 |
| 385328 | 9/1973 | U.S.S.R. | 252/62.61 |
| 407402 | 4/1974 | U.S.S.R. | 252/62.61 |

*Primary Examiner*—Jack Cooper
*Attorney, Agent, or Firm*—Robert G. Clay

[57] ABSTRACT

Lithium ferrites are sintered with a mixture of phosphorus pentoxide and vanadium pentoxide or bismuth trioxide to produce memory cores of high density and small grain size having high figures of merit. The lithium ferrites may contain additional ions such as zinc, nickel and manganese.

1 Claim, No Drawings

PROCESS OF MAKING SHAPED ARTICLE OF LITHIUM FERRITE CONTAINING PHOSPHORUS PENTOXIDE WITH VANADIUM PENTOXIDE OR BISMUTH TRIOXIDE SINTERING AGENTS

This is a continuation of application Ser. No. 907,039, filed May 18, 1978, now abandoned.

SUMMARY OF THE INVENTION

Lithium Ferrite, $Li_{0.5}Fe_{2.5}O_4$, is the basic material for many of the square-loop memory cores manufactured today. Pure lithium ferrite has the highest Curie temperature (635° C.) and inherently square-loop properties and, therefore, is the best basic material for the design of memory cores which must operate over wide ranges of temperature.

The fabrication of memory cores requires the preparation of a ferrite powder, the preparation of cores from this powder and the high-temperature firing (sintering) of the cores to produce a dense polycrystalline structure. The firing must be carried out at a temperature high enough to produce cores of very high density (low porosity) because square-loop properties occur only in such materials. The temperature required to fire lithium ferrite to high density causes chemical decomposition of the material; lithium oxide is evaporated and ferric iron is converted to ferrous. The presence of ferrous iron in the material has a detrimental effect on the magnetic properties, causing a decrease in the squareness of the hysteresis loop.

The substitution of certain metal ions for ferris and lithium ions in the lithium ferrite permits a suitable high density to be obtained at a lower temperature. Notable in this respect is trivalent manganese substituted for iron, however, the influence of manganese on the sintering temperature is not very great. In addition to its effect on sintering behavior the presence of manganese modifies the magnetic properties, sometimes in a desirable way (e.g. it decreases magnetostrictive ringing) and is, therefore, often included in lithium ferrite formulation.

Nickel is included in some compositions to increase squareness of the hysteresis loop. The coercive force and, therefore the switching current, is controlled by adding zinc to the formulation. The greater the percentage of zinc, the lower the required switching current.

Densification of lithium ferrite can be brought about by the introduction of very small quantities of certain chemical agents which cause sintering to take place at relatively low temperature, well below the decomposition temperature of lithium ferrite which is ordinarily about 1050° C. Several of these agents are oxides of the Group V metals in the periodic table of the elements, for example, vanadium pentoxide and bismuth trioxide have been successfully used as sintering agents for lithium ferrites. These substances are very active sintering agents and tend to cause the formation of large crystallites. In memory cores of very small dimensions, for example 18-mils in diameter, the crystallites are too large; the coercive force which is in part determined by crystallite size cannot be controlled and the properties of the cores are very restricted.

It is reasonable to predict that other oxides of the metals in Group V of the periodic table would behave as sintering agents for lithium ferrites because the properties of these elements possess many similarities. We have discovered, however, that several of the other oxides are completely ineffective as sintering agents. Phosphorous pentoxide, tantalum pentoxide and antimony oxides do not promote the sintering of lithium ferrite and furthermore, if added to the ferrite in sufficient but yet very small quantities these oxides can inhibit sintering.

In accordance with the present invention it has been found that if phosphorus pentoxide is added to the lithium ferrite in addition to vanadium pentoxide or bismuth trioxide the activity of the latter two sintering agents can be very much modified. If phosphorus pentoxide and vanadium pentoxide are added to the ferrite in the correct proportions densification and grain growth of the ferrite can be controlled so that memory cores with the desired properties can be produced.

Any salts which decompose to yield the oxides of the desired sintering agents can be used for the sintering operation. Thus, dibasic ammonium phosphate or monobasic ammonium phosphate can be used as the source of $P_2O_5$. The source of $V_2O_5$ can be reagent grade $V_2O_5$ or ammonium metavandate. Bismuth is ordinarily supplied in the form of reagent grade $Bi_2O_3$.

The mol ratio of the vanadium or bismuth to the phosphorus can vary from about 0.6 to about 1.5. The total quantity of the sintering agent to the ferrite can vary from 0.5 to 3.0 mol percent. These ratios are based on the quantity of the metal ions present.

DESCRIPTION OF THE PREFERRED EMBODIMENTS

The following general peparation procedure was used in all of the examples:

A typical substituted lithium ferrite composition has the chemical formula:

$$Li_{0.38}Zn_{0.12}Ni_{0.08}Mn_{0.32}Fe_{2.10}O_4$$

This composition was prepared from reagent grade lithium carbonate, $Li_2CO_3$ (100% pure), zinc oxide, ZnO (99.8% pure), nickel oxide, NiO (99.8% pure), manganous carbonate (assay, 63.97% $Mn_2O_3$), and iron oxide, $Fe_2O_3$ (99.2% pure) together with a sintering agent, if used, as is hereinafter described.

Quantities of materials appropriate for one gram-molecular weight of ferrite were weighed into a ball-mill jar of 1.4 liters capacity. These materials included 14.039 g. $Li_2CO_3$, 9.766 g. ZnO, 5,977 g. NiO, 25.258 g. manganous carbonate, 167.685 g. $Fe_2O_3$, and desired quantities of the sintering agent. Relative to the formula given above there was a deficiency of $Fe_2O_3$ amounting to 0.8 weight percent which compensated for iron picked up by the abrasion of the steel balls used in milling. The jar contained 2700 g. of stainless steel balls. Enough isopropyl alcohol was added to make a thin slurry. The jar was sealed and rotated for a period of 18 hours. The slurry was removed from the ball mill and placed in a drying oven where the alcohol was evaporated. The cake obtained from this operation was forced through a 40-mesh sieve, placed in a pure aluminum oxide crucible and reacted at a temperature of 790° C. for two hours. During this operation the formation of the ferrite was essentially completed. The ferrite was ground again in the ball mill for 18 hours, the slurry then dried and dried material sieved.

Twelve weight percent of a mixture of polyvinyl chloride binder and butyl benzyl phthalate plastisizer dissolved in a solvent mixture of toluene and acetone was mixed with the ferrite. Following the evaporation of the solvents the material was formed on a roller mill into a thin sheet, held together and given strength by the binder.

Cores were punched from this sheet. The binder was "burned out" of the cores by slowly heating them to a temperature of 500° C. The cores were sintered by heating them to a temperature between 980° C. and 1040° C. for time periods of three to twenty minutes. Sintering temperature and time can be varied to control within certain limits the electrical properties of the cores. The dimensions of the cores after sintering were: outside diameter 0.018 in., inside diameter 0.0115 in., height 0.0045 in.

The following examples were prepared:

EXAMPLE 1

No sintering agent.

EXAMPLE 2

The sintering agent was 0.01 gram molecular weight of $V_2O_5$.

The two above examples relate to prior art compositions and are given for comparison purposes.

EXAMPLES 3–7

In these samples phosphorus with vanadium or bismuth was employed as a sintering agent. The sintering agent was added to the raw materials just prior to ball milling. The quantities are as set forth in Table I. The properties of the cores obtained from these various preparations are compared in Table I and also compared with the properties of the same composition prepared without the aid of the sintering agent. The symbols used in the table have the significance currently standard in the computer memory industry. ($I_f$=full-write or read current; $I_{pr}$=partial write or read current; $uV_1$=the undisturbed voltage one output; $dV_1$=the disturbed voltage one output; $dV_z$=the disturbed zero voltage output; $t_s$=the switching time of the $dV_1$ signal and $I_k$=the knee current which is proportional to the coercive force. The ratios $dV_1/dV_z$ and $I_k/I_f$ can be taken as figures of merit for the performance of memory cores, a large value for both indicating superior performance. The values of $dV_1/dV_z$ and $I_k/I_f$ are 4.8 and 0.66 respectively for the composition given above made into memory cores without the use of a sintering agent and sintered at a relatively high temperature or for a relatively long period of time (Example 1). The addition of $V_2O_5$ alone as a sintering agent causes rapid sintering and produces a greater $dV_1/dV_z$ ratio but a smaller $I_k/I_f$ ratio (Example 2). The best combined values of the two ratios were obtained when the sintering agent consisted of 0.010 gram-molecular weight each of vanadium and phosphorus pentoxides (Example 4). The other compositions, however, represent improvements in respect to the materials prepared without a sintering agent or the one prepared with $V_2O_5$ alone. The properties of the same basic composition prepared with addition of bismuth trioxide and phosphorus pentoxide are given in Example 7. The figures of merit are slightly smaller than those for the best $V_2O_5$—$P_2O_5$ sintering agent but much greater than those for the composition without the sintering agent.

The basic composition 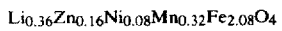 is typical of the lithium ferrite compositions in commercial use today. Many other compositions can be prepared for particular applications by varying the proportions of the various metal ions. For example the coercive force can be decreased by increasing the zinc content and cores can be prepared which will be driven by currents of smaller amplitude. The following formula is an example which gives cores for $I_f$ equal to 500–600mA:

$$Li_{0.36}Zn_{0.16}Ni_{0.08}Mn_{0.32}Fe_{2.08}O_4$$

The sintering behavior of this composition is very similar to the one above and the introduction of the $P_2O_5$—$V_2O_5$ sintering agent will improve the properties in a similar fashion.

TABLE I

Properties of Memory Cores with the composition $Li_{0.38}Zn_{0.12}Ni_{0.08}Mn_{0.32}Fe_{2.10}O_4$ sintered with the aid of $V_2O_5$—$P_2O_5$ and $Bi_2O_3$—$P_2O_5$ additions.[1]

| EXAMPLE | Sintering Agent[2] $V_2O_5$ | $P_2O_5$ | $V_2O_5/P_2O_5$ | $I_f/I_{pr}$ | $uV_1$ (mV) | $dV_1$ (mV) | $dV_z$ (mV) | $t_s$ (ns) | $I_k$ (mA) | $dV_1/dV_2$ | $I_k/I_f$ |
|---|---|---|---|---|---|---|---|---|---|---|---|
| 1. | 0 | 0 | | 750/475 | 48 | 43 | 9 | 190 | 495 | 4.8 | 0.66 |
| 2. | 0.010 | 0 | | 750/450 | 39 | 36 | 6 | 200 | 460 | 6.0 | 0.61 |
| 3. | 0.008 | 0.0125 | 0.64 | 750/500 | 40 | 37 | 4.5 | 210 | 520 | 8.2 | 0.69 |
| 4. | 0.010 | 0.010 | 1.0 | 750/500 | 44 | 41 | 4.5 | 220 | 530 | 9.1 | 0.71 |
| 5. | 0.012 | 0.010 | 1.2 | 750/500 | 41 | 38 | 4.5 | 210 | 520 | 8.4 | 0.69 |
| 6. | 0.015 | 0.010 | 1.5 | 750/500 | 41 | 38 | 5.0 | 210 | 520 | 7.6 | 0.69 |
| | $Bi_2O_3$ | $P_2O_5$ | $Bi_2O_3/P_2O_5$ | | | | | | | | |
| 7. | 0.015 | 0.010 | 1.5 | 750/500 | 43 | 40 | 5.0 | 215 | 520 | 8.0 | 0.69 |

[1] Standard memory core-test current-pulse program. Currents $I_f$, $I_{pr}$, $I_k$ in milliamperes.
[2] Gram-molecular weights per gram-molecular weight of ferrite.

We claim:

1. In the process of making a shaped article of a lithium ferrite having the formula:

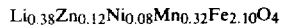

wherein the ferrite raw materials are reacted by heating them to an elevated temperature wherein the temperature and time of heating are selected to cause said materials to react to form a reacted ferrite, followed by cooling, mixing the reacted ferrite with a binder and sintering agent, forming a shaped article and then sintering said shaped article at an elevated temperature of from about 980° C. to 1040° C. and for a time of from about 3 to 20 minutes, the improvement wherein the sintering agent comprises a mixture of a phosphorus compound with a member selected from vanadium and bismuth compounds said phosphorus, vanadium and bismuth compounds being selected from the oxides of said metals and compounds which decompose to oxides under the above defined sintering conditions, wherein the mol ratio of the vanadium or bismuth to the phosphorus is from about 0.6 to about 1.5 and the total quantity of the sintering agent to the ferrite is from about 0.5 to 3.0 mol percent.

* * * * *